(No Model.) 6 Sheets—Sheet 2.
G. A. LAWRENCE.
APPARATUS FOR SHAVING HIDES.
No. 528,638. Patented Nov. 6, 1894.

WITNESSES. INVENTOR.

(No Model.) 6 Sheets—Sheet 3.

G. A. LAWRENCE.
APPARATUS FOR SHAVING HIDES.

No. 528,638. Patented Nov. 6, 1894.

WITNESSES
B. W. Williams
A. G. Belcher.

INVENTOR.
George A. Lawrence
By his Atty.
Henry W. Williams (No Model.) 6 Sheets—Sheet 4.
G. A. LAWRENCE.
APPARATUS FOR SHAVING HIDES.
No. 528,638. Patented Nov. 6, 1894.
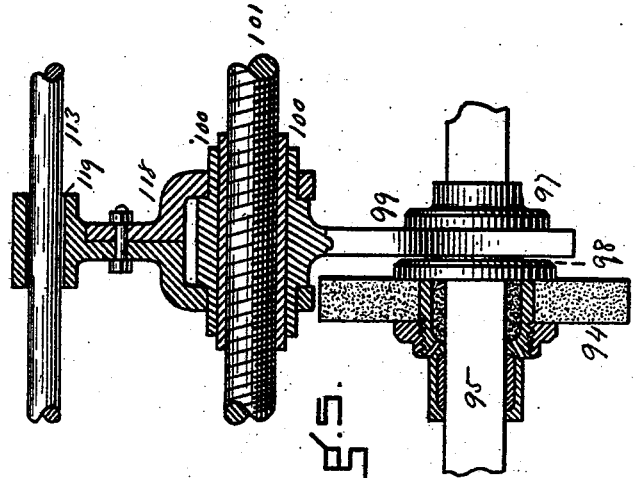
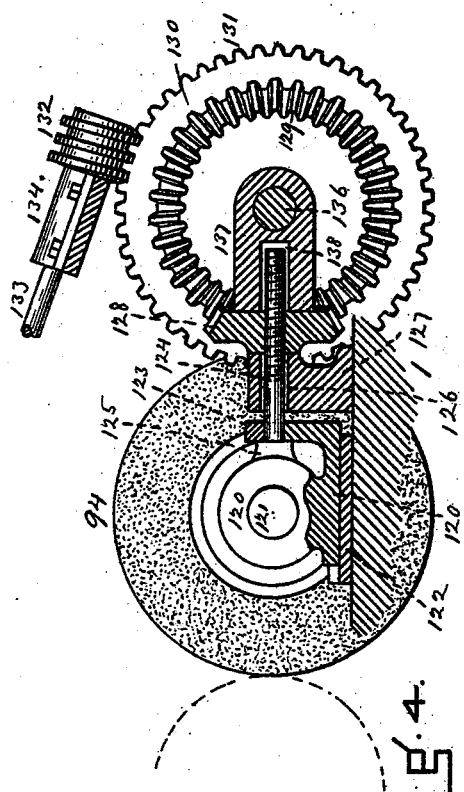
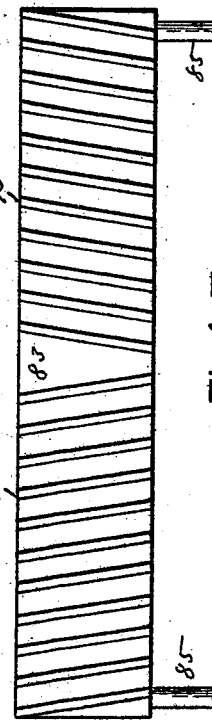
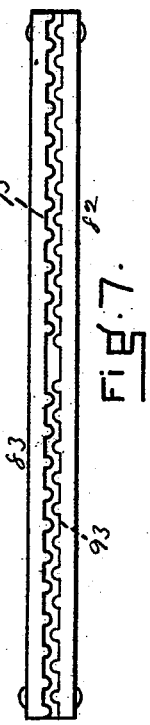
Witnesses
B. M. Williams
A. G. Belcher
Inventor
George A. Lawrence
By his Att'y
Henry W. Williams (No Model.) 6 Sheets—Sheet 5.
G. A. LAWRENCE.
APPARATUS FOR SHAVING HIDES.
No. 528,638. Patented Nov. 6, 1894.
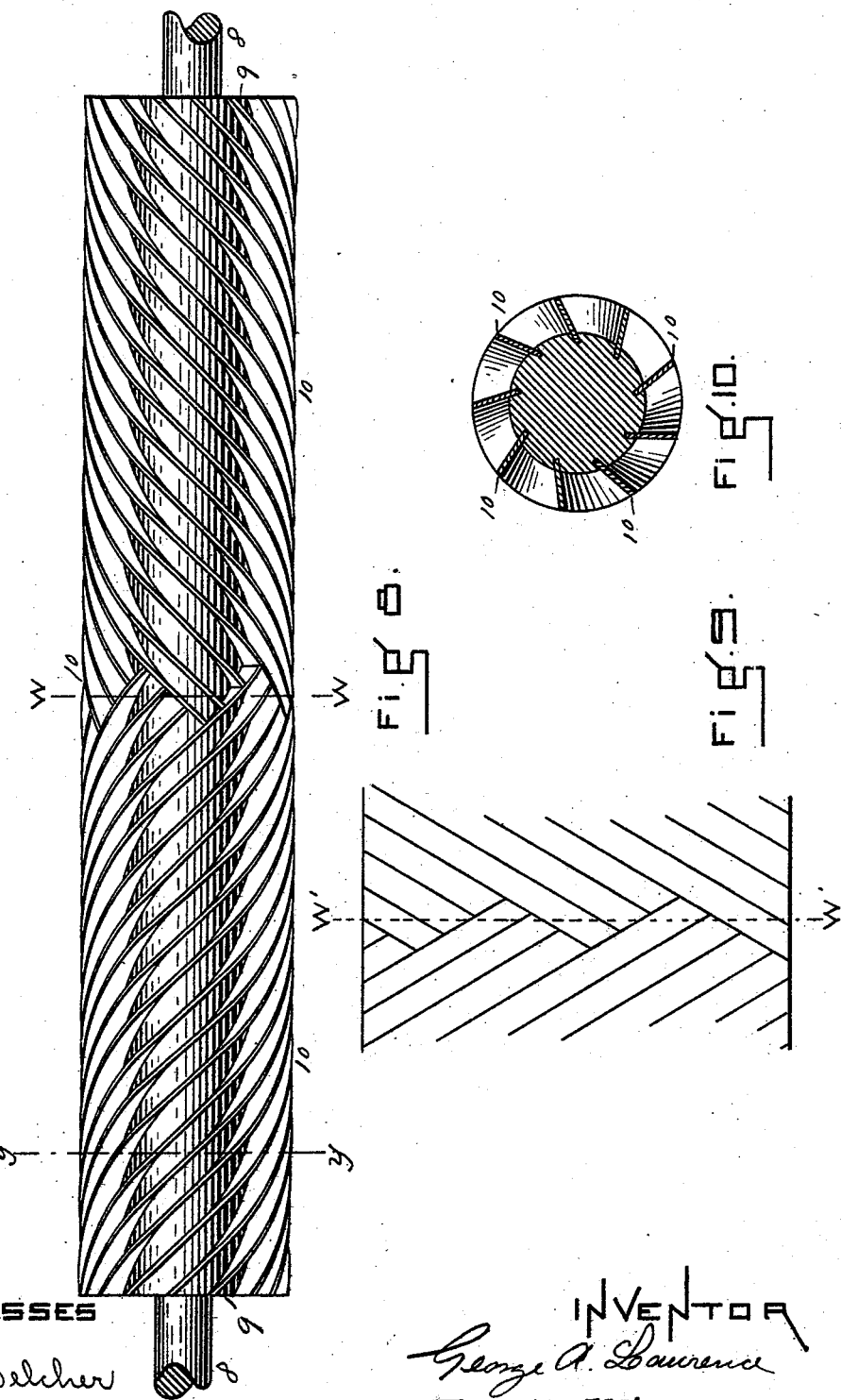
WITNESSES
A. G. Belcher
B. W. Williams
INVENTOR
George A. Lawrence
By his Att'y.
Henry Williams

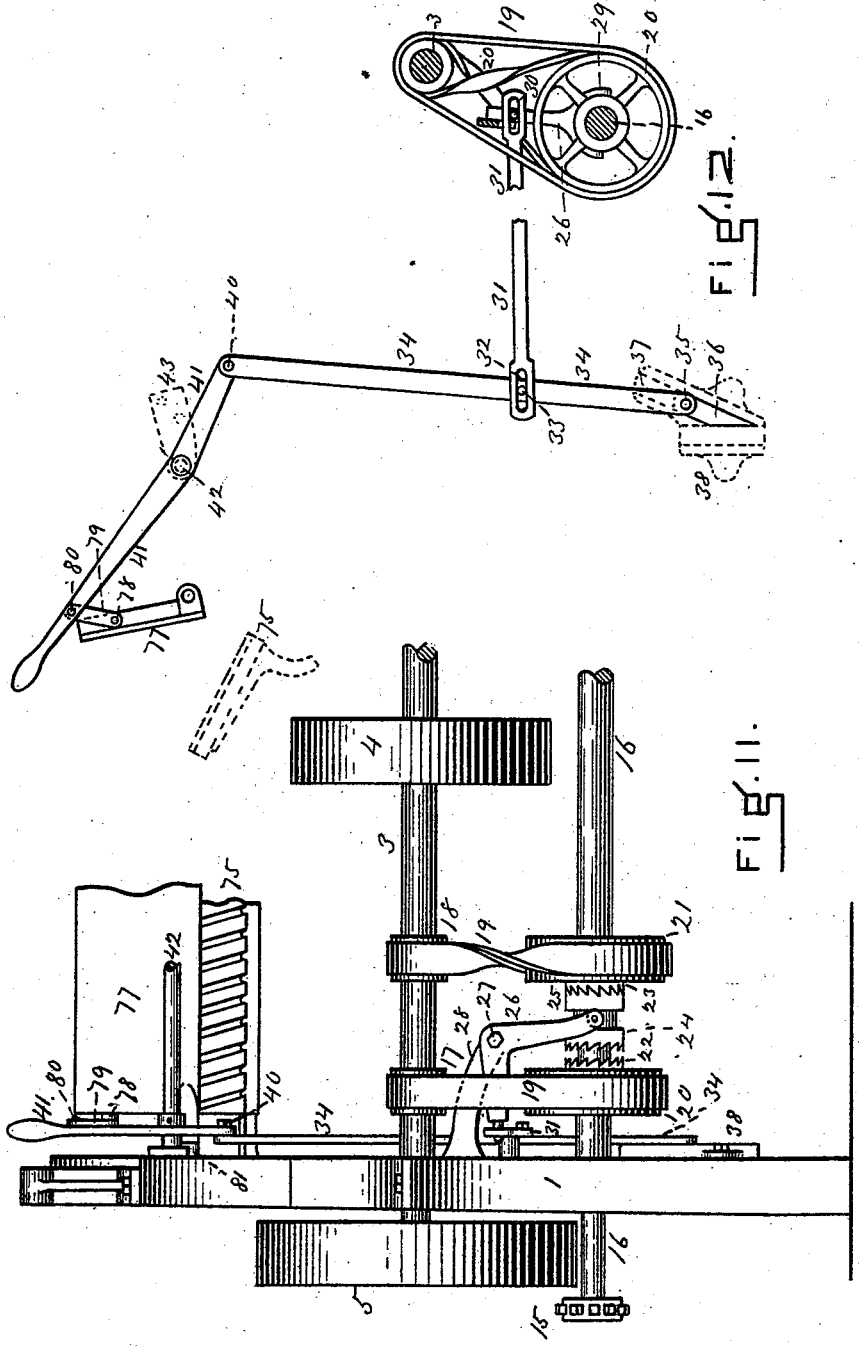

UNITED STATES PATENT OFFICE.

GEORGE A. LAWRENCE, OF PEABODY, ASSIGNOR TO THE LAWRENCE SHAVING MACHINE COMPANY, OF SALEM, MASSACHUSETTS.

APPARATUS FOR SHAVING HIDES.

SPECIFICATION forming part of Letters Patent No. 528,638, dated November 6, 1894.

Application filed August 1, 1893. Serial No. 482,087. (No model.)

*To all whom it may concern:*

Be it known that I, GEORGE A. LAWRENCE, of Peabody, in the county of Essex and State of Massachusetts, have invented new and useful Improvements in Machines for Shaving or Fleshing Hides or Skins, of which the following is a specification.

This invention has for its principal objects, to turn out a greater quantity of work by shaving the entire width of the skin in one operation, and to accomplish better results by producing a smoother and more even finish, whereby what is technically known as "chattering" or irregular cutting is avoided; and the nature of the invention consists in certain novel constructions and arrangements of parts hereinafter described and illustrated in the accompanying drawings, in which—

Figure 1:
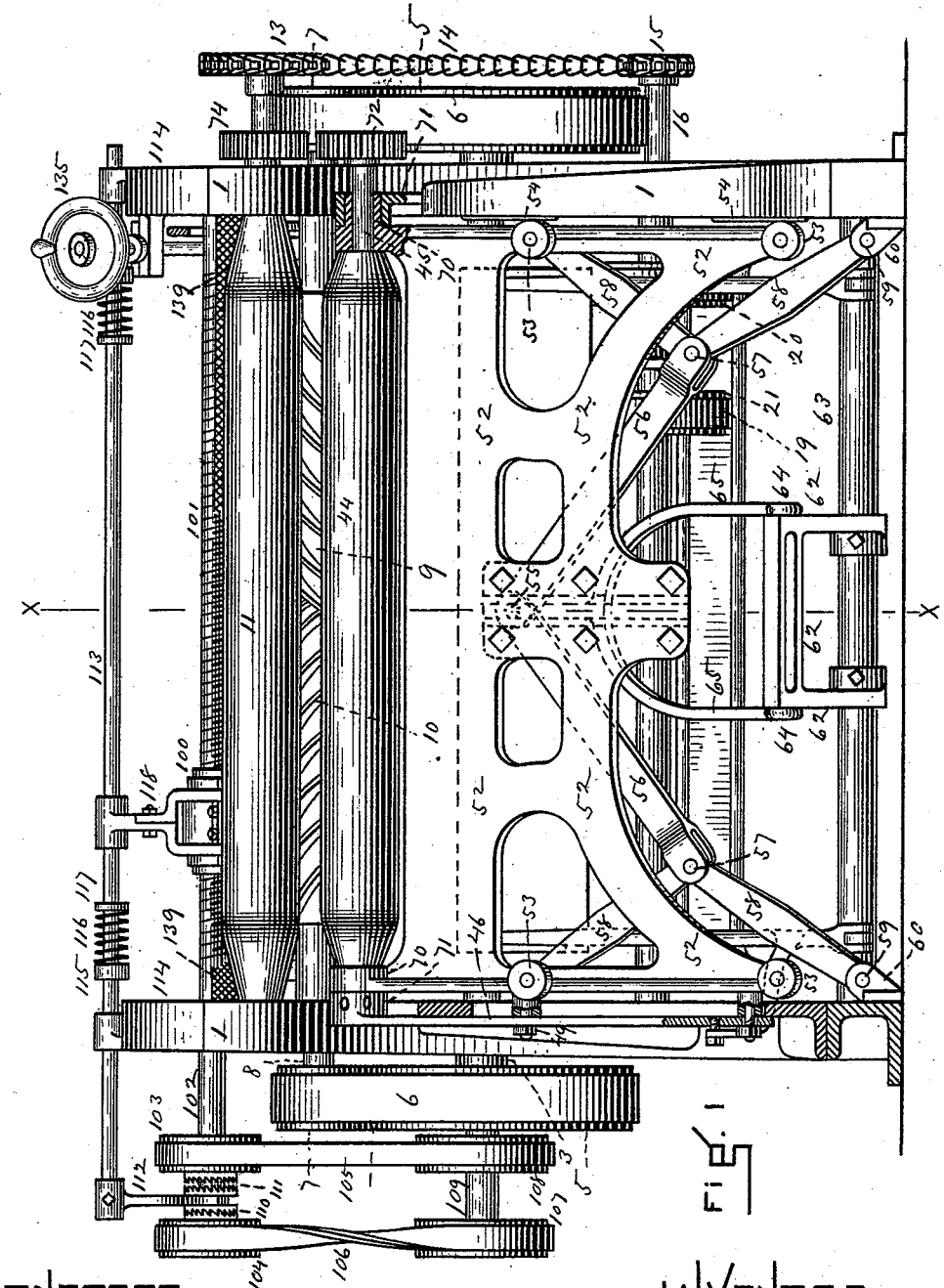
Figure 2:
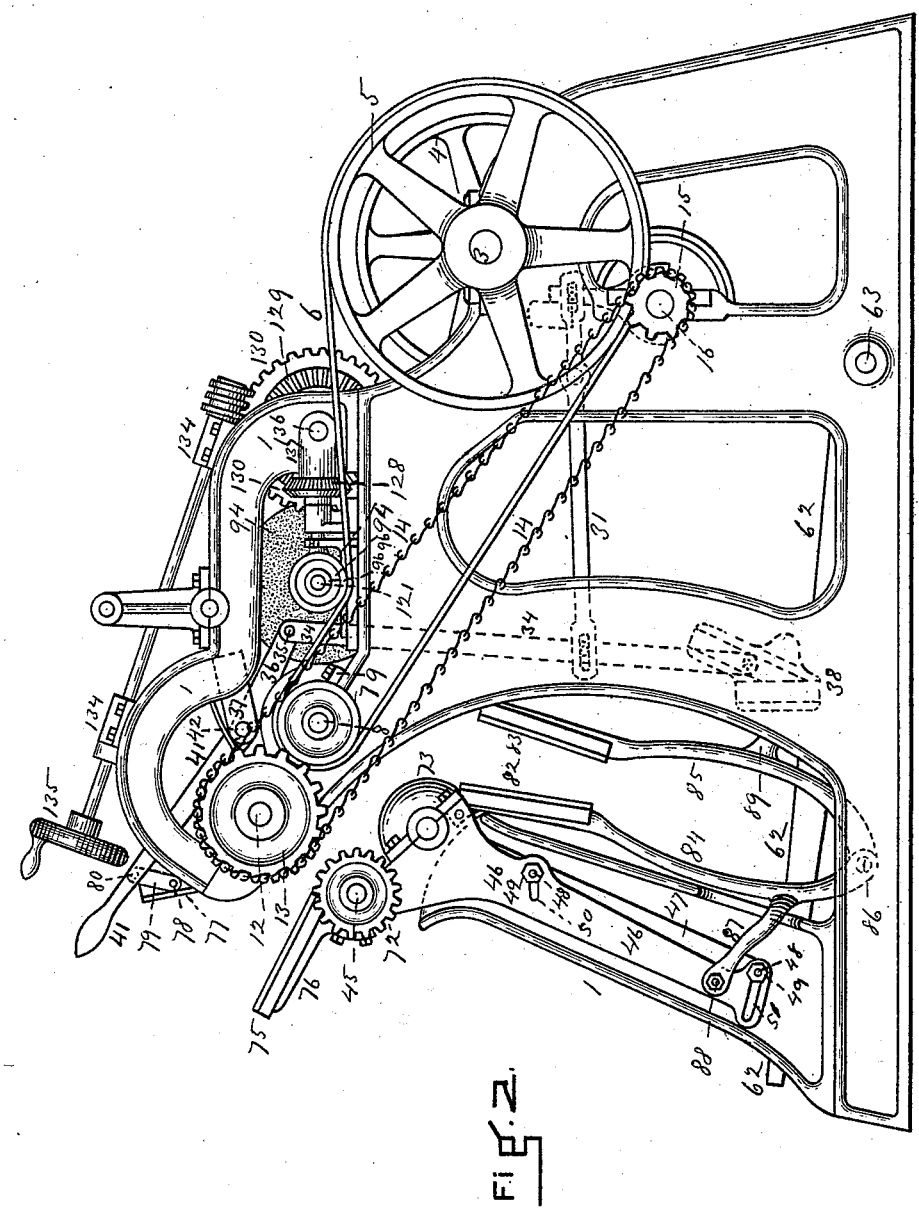
Figure 3:
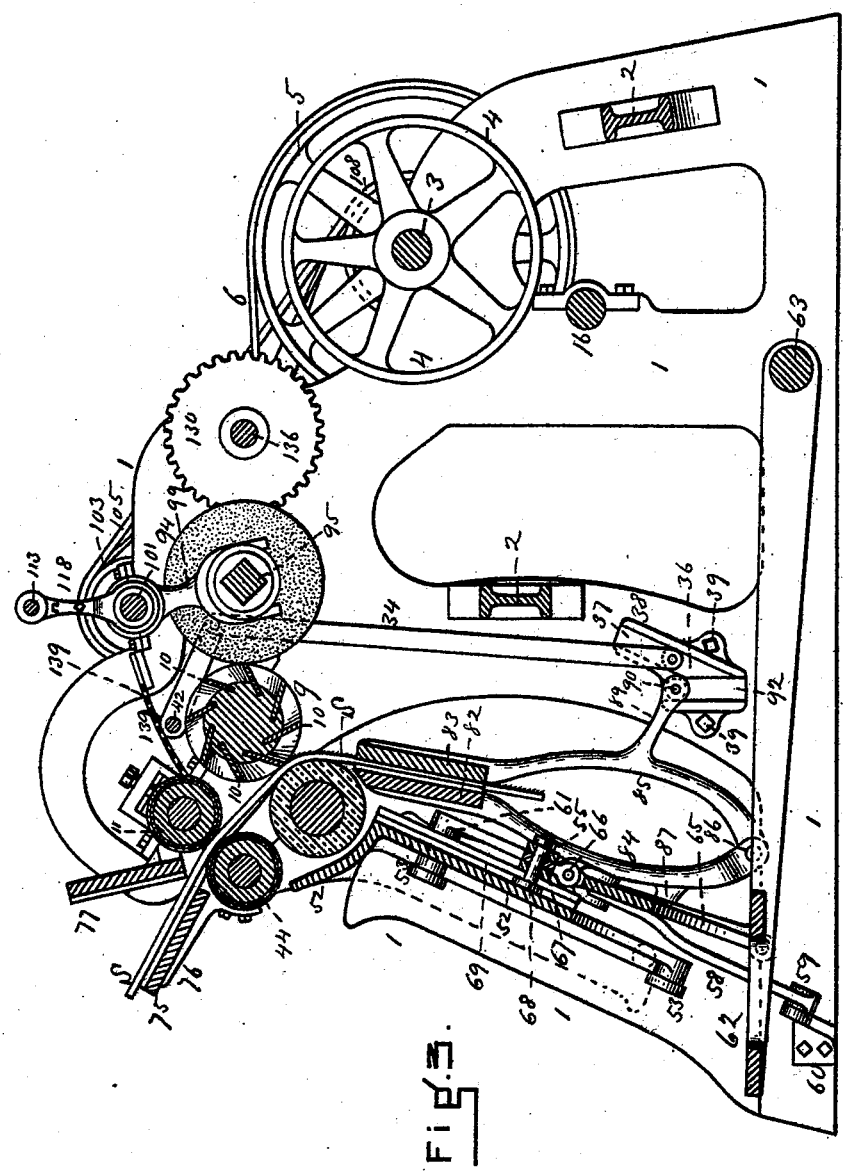

Figure 1 is a front elevation of my improved machine, portions being shown in vertical section, and the spreaders having been removed. Fig. 2 is a side elevation of the complete machine. Fig. 3 is a central longitudinal vertical section on line $x$, Fig. 1. Figs. 4 and 5 are enlarged sectional details of the grinding mechanism and adjacent parts. Fig. 6 is an elevation of one of the lower pair of spreading plates. Fig. 7 is a plan view of a pair of said plates together. Fig. 8 is an enlarged elevation of the cutting cylinder. Fig. 9 is a diagram showing the method of laying out the cutters in said cylinder. Fig. 10 is a section of the cutting cylinder taken on line $y$, Fig. 8. Fig. 11 is a detail in rear elevation of the mechanism for reversing the feed, and a portion of the spreading mechanism. Fig. 12 is a side elevation in detail and vertical section illustrating the reversing mechanism. In Figs. 1 and 2 the feed rolls are separated, and in Fig. 3 they are closed and the machine is in operation.

Similar letters and figures of reference indicate corresponding parts.

1 represents the frame, consisting principally of two sides connected by suitable cross pieces. Mounted in this frame is the driving shaft 3 provided with the driving pulley 4. Fast on the driving shaft near its opposite ends are the pulleys 5 connected by belts 6 with the pulleys 7, fast on the opposite ends of a shaft 8 mounted in the frame, and on which is the cutting cylinder 9. This cutting cylinder, (see Figs. 8, 9, and 10,) is provided with two series of spiral knives or cutters 10, the cutters in each series extending from an end of the cylinder to about the middle thereof. Each series of cutters is composed of a number of sub-series, each sub-series or sub-division consisting of a plurality of cutters, say three in number.

Considering lines $w$ and $w'$ to represent the center longitudinally of the cutting cylinder, it will be noticed that each set of three cutters abuts against the outer side of the uppermost and outermost cutter of a set of three extending from the opposite end of the cylinder, so that the inner ends of one series of cutters underlap the inner abutting ends of the other series, and are underlapped at their inner ends by the cutters of the other series in alternate sets of three cutters each.

It will be observed that the cutters do not all extend beyond the middle line $w$ and also that from the nature of the case they do not meet the opposite cutters at the middle line; but in each set or sub-series of three cutters, one at least extends beyond the middle line and one of them falls short of the middle line. I claim by this construction and arrangement, that it is possible to shave the skin very smoothly and prevent the occurrence of marks or tracks at the end of the travel of the cutters, as is apt to be the case when the series of cutters meet in the middle of the cylinder or when the cutters uniformly extend to a certain point beyond the middle.

11 is the upper feed roll having its bearings in the frame 1 as shown, and operated by a shaft 12 on which is rigidly secured the sprocket wheel 13, connected by the chain 14 with the sprocket wheel 15 fast on the shaft 16 supported by the frame. See Figs. 1, 2 and 11.

The driving shaft 3, see Figs. 11 and 12, has two fast pulleys 17 and 18 upon it which are connected by belts 19 with the loose pulleys 20 and 21 respectively on the shaft 16. These loose pulleys are provided with ordinary clutch mechanism 22 and 23 adapted to engage alternately the other parts 24 and 25 of the clutches, which are arranged to rotate with the shaft 16.

An elbow-lever 26 is pivoted at 27 to a bracket 28 extending from the frame, and is provided with a yoke 29 which straddles the shaft 16 between the clutches. The opposite end of this lever extends into the slot 30 in the link 31, and the slot 32 in the opposite end of said link engages a pin 33 on a lever 34. The lower end of this lever 34 is pivotally secured at 35 to a block 36 sliding in the diagonal groove 37 formed in the plate 38 bolted at 39 to the frame. See Fig. 3 and broken lines in Figs. 2 and 12.

The upper end of the lever 34 is pivotally secured at 40 to the lever 41, fulcrumed on and rigidly secured to the shaft or horizontal rod 42 supported by brackets 43 extending from the frame. Lifting the handle of the lever 41 presses down the lever 34, whose lower end slides by means of the block 36 in the groove 37, and the swing of the lever 34 causes the link 31 to move the elbow-lever or shipper 26 and draw the clutch 22 out of engagement with the pulley 20 and the clutch 23 into engagement with the pulley 21, thus reversing the shaft 16, and hence the upper feed roll 11. This system of levers is duplicated on the opposite side of the machine, with the exception that the handle portion of the lever 41 is cut off above the shaft 42. The object of reversing the motion of the roll will appear below.

The lower feed roll 44 is fast on the shaft 45 having its bearings in the upper ends of diagonally set supports or carriages 46 sliding diagonally and nearly vertically in slots 47 in the frame 1, (Fig. 2.) The supporting carriages 46 are adjustably secured as to their angle of inclination in these slots 47 by means of bolts 48, nuts 49 and slots 50 and 51, so that the carriages swivel or turn on the shaft 45 for the purpose of allowing the bed roll 73 to be swung up to the cylinder, without affecting the relation of the lower feed roll 44 to the upper feed roll 11. The carriages 46, which are located on each side of the frame, are secured by means of said bolts to the opposite ends of a diagonally and nearly vertically vibrating frame 52 (see Fig. 1), whose edges are provided with rollers 53 which run on the tracks or plates 54 placed on the inner sides of the frame 1 near the slots 47. This lifting frame 52 has pivoted to it centrally at 55 two links or levers 56, whose outer ends are pivoted at 57 to the levers 58, each pair of which constitutes a toggle joint, the lower ends of which are pivotally secured at 59 to brackets 60 extending from the inner sides of the frame, and the upper ends of which are pivotally secured at 61 to the rear side of the vibrating frame 52.

A treadle 62 has its rear ends secured to a rocking shaft 63 supported by the frame, the front end of said treadle being pivotally hung at 64 from a saddle 65 whose upper end is pivotally secured at 66 (Fig. 3) to a hanger 67 depending from the pivot 55 of the toggle 56, said pivot being provided with an extension 68 running in the groove 69 on the rear side of the frame 52. This frame 52 is hung from the shaft 45 by integral hubs 70, and the supports 46 are hung from the same shaft by means of integral hubs or sleeves 71. The supports 46 sustain in addition to the lower feed roll 44, the bed roll 73 running freely in bearings in said supports.

In Figs. 1 and 2 the treadle 62 is raised, being held raised by the greater weight of the vibrating frame 52. When the treadle is depressed, the toggles 56 straighten, their pivot 55 being guided in its downward movement by the guide-groove 69, and the toggles 58 straighten, pushing up the frame 52 and hence the supports 46 guided by the grooves 47, and the rolls 44 and 73 are brought up against the rolls 11 and 9 respectively, as shown in Fig. 3, the swiveled connections of the roll 44 with the frame 52 and supports 46 allowing the feed roll 44 and bed roll 73 to accommodate themselves to the feed roll 11 and cutter roll 9. The bed roll 73 rotates by the friction of the cutting cylinder 9. The lower feed roll 44 rotates by reason of a gear wheel 72 fast on the shaft 45 being brought into engagement with the gear wheel 74 fast on the shaft 12, by the lifting frame 52.

75 is a horizontal spreading feed plate rigidly secured at the proper angle to brackets 76 extending from the supports 46. An upper spreading feed plate 77 (Figs. 2, 3, 11 and 12) is pivotally secured at 78 to a link 79 whose opposite end is pivotally secured at 80 to the lever 41. This spreading plate is pivotally secured at its opposite ends at 81 (Fig. 11) to the frame.

82 and 83 are a pair of spreading plates secured to the upper ends of jaws 84 and 85 whose lower ends are pivoted at 86 to each other, as shown in Figs. 2 and 3. The spreader 82 is rigid with the lifting frame 52 and the jaw 84 has rigid arms 87 whose farther ends are pivotally connected at 88 with the supports 46, and the jaw 85 has rigid arms 89 whose farther ends are provided at 90 with rolls which slide in the grooves 92 in the plates 38. The face of every one of these spreading plates 82, 83, 75 and 77 is provided with diverging corrugations 93, as shown in Figs. 6 and 7, for the purpose of spreading the leather as it is fed to the cutting cylinder, the divergence being in the direction of the movement of the work.

The position of the machine when at rest is shown in Figs. 1, 2, 11 and 12. The skin is laid on the spreader 75 hanging down between the spreaders 82 and 83, and the treadles 62 pressed down with the effect of raising the supports 46 so as to bring the lower feed roll into gear with the upper feed roll and also cause the bed roll 73 to press the skin against the cutting cylinder 9. The same operation lifts the arms 84 by means of the links 87 and hence swings up the arms 85 which are connected by the links or levers 89 with the grooves 92 in the plates 38. The result is that the rolls 90, rising in said grooves, cause the arms 85 to move forward so that the jaws close the spreaders 82 and 83 into the position shown in Figs. 3 and 7. The skin is spread by the divergingly grooved parts 82 and 83 and operated on by the cutting cylinder, being pulled through by the feed rolls. The treadle may then be released and the skin reversed and put through the same operation. If it is desired to feed the skin in the other direction the handle or lever 41 is pressed down before the treadle is depressed. The effect, as above mentioned, is to slide the block 36 up to the groove 37 in the plate 38 and reverse the clutch mechanism shown in Fig. 11. Then the skin may be laid on the spreader 75, and the sliding supports 46 lifted by the treadle, the effect of which on the lower spreaders is to keep them apart by reason of the roll 90 sliding up the groove 37 (which has been left vacant by the lifting of the block 36) instead of the groove 92. The skin is then fed by the rolls 11 and 44 and spread by the spreaders 76 and 77.

It is found advisable to keep the cutters constantly sharp. This is done by the use of an emery wheel 94, Figs. 2, 3, 4 and 5, mounted and sliding on a squared shaft 95 having bearings in the frame and driven by the belts 6 through the medium of the pulleys 96. The hub 97 (Fig. 5) of the emery wheel is provided with an annular groove 98 into which extends a yoke 99 whose upper end is integral with a nut 100 which is internally screw-threaded to fit over the horizontal screw 101, which has plain bearings in the opposite sides of the frame of the machine, and from which extends a shaft 102 (Fig. 1) on which are loose pulleys 103 and 104 belted at 105 and 106 to the pulleys 107 and 108 on the shaft 109 extending to the main driving shaft 3. An ordinary clutch mechanism 110 and 111, similar to that shown at 22, 23, 24, and 25, Fig. 11, is provided, and a shipper 112 extends down from a horizontally longitudinally reciprocating rod 113 supported by brackets 114 secured to the upper edges of the frame 1 of the machine. This rod 113 is provided with fixed stops 115, sufficiently inside the brackets 114 to allow a slight longitudinal reciprocation or play. Next these stops are spiral springs 116 and at the inner ends of the springs are disks or rings 117 loose on the rod 113. The nut 100 is connected by an engaging device 118 (Figs. 1 and 5) with the rod 113, said engaging device being provided with a horizontal opening 119, of size to allow it to slide freely on said rod.

When the machine is in motion, the screw 101 is rotated by reason of the engagement of one of the clutches 110 and 111 with one of the pulleys 103 and 104 on the shaft 102, with the result that the emery wheel 94, which is rotated by the pulleys 96, is moved horizontally on the squared shaft 95 by the yoke 99 extending down from the nut 100, which is moved horizontally by the rotation of the screw 101. Now when the nut 100 approaches one end of the screw, the device 118 strikes the ring or disk 117, and compressing the spring 116, moves horizontally the rod 113 until its movement is checked by the stop 115 striking the brackets 114. This causes the shipper 112 to engage one of the clutches 110 and 111 and reverse the screw 102, thus causing the nut 100 to travel in the opposite direction until a similar effect is produced by the device 118 coming in contact with the yielding disk 117 at the opposite end. By this means the emery wheel is kept constantly traveling back and forth on the shaft 95, at the same time rotating, and hence constantly sharpening the cutters 10 on the cutting cylinder.

In order to provide lateral adjustment to the emery wheel so as to keep it up to its work as the cutters wear, the studs 121 which give rotation to the squared shaft 95 are mounted in slides 120, which slide transversely with the cutting cylinder on tracks or plates 122 on the frame 1. These slides are angle shaped as shown in Fig. 4, and the vertical portions 123 are bored horizontally to receive the screws 124, whose heads 125 are made concave to fit against the mountings 120. These screws pass through horizontal plain holes 126 in the uprights 127 extending from the frame 1, and engage bevel gear wheels 128, which are in engagement with the face gears 129 on the gear wheels 130, one of whose peripheral gears 131 is in engagement with the worm 132 on the shaft 133 (Figs. 2 and 4) supported in boxes 134 sustained by the frame and actuated by a hand wheel 135. The gear wheels 130 are fast on the shaft 136 supported by the frame, and stop-pieces 137, bored at 138 to receive the screws 124, extend from the shaft 136 and bear against the rear sides of the bevel gears 128. By turning the hand wheel 135, the gear wheels 130 rotate the bevel gears 128 and cause the screws 124 to move the slides 120, adjusting the emery wheel to the wear of the knives on the cutting cylinder.

I provide a curved guard 139 (Figs. 1 and 3) which extends from the frame and covers the cutting cylinder, this guard being perforated or made of open-work material. This not only prevents the particles from flying, but it also prevents a draft of air being formed, as would be the case if the guard were made of solid material. In other words, my device provides a guard without a draft of air, the air entering the peforations and neutralizing the tendency to a draft.

Having thus fully described my invention, what I claim, and desire to secure by Letters Patent, is—

1. In a machine for shaving or fleshing hides or skins, a cutting cylinder provided on its periphery with two series of spirally arranged knives 10 as shown, the two said series being on opposite sides of the longitudinal center of the cylinder and each of said series being divided into sub-series or sets of knives, each of said sub-series or set consisting of a plurality of knives whose inner ends abut against the face or side of one of the knives constituting a sub-series extending from the opposite end of the cylinder, and one at least of the knives in each sub-series extending beyond the line of the longitudinal center of the cylinder and one of the knives of each sub-series stopping short of the said central line, whereby the ends of each sub-series of spiral knives are as a whole on both sides of said line, substantially as described.

2. In combination, the lower feed-roll 44, sliding carriage 46, frame provided with the slots 47, vibrating or lifting frame 52, levers 56 pivotally secured to said lifting frame and spreading as shown, toggle joints 58 connecting at their joints with the lower ends of said spreading levers and with their outer ends secured pivotally to the frame, and to the vibrating frame respectively, hangers 67 depending from the pivot 55 connecting the two levers 56, and extension 68 from said pivot extending into the groove 59 on the frame 52, substantially as set forth.

3. The combination of the lifting supports 46 sliding in the frame as described, the jaws 84 and 85 hinged together at their lower ends and provided respectively with spreading plates 82 and 83, the plates 38 secured to the frame and provided with the relatively diagonally formed grooves 92 and 37, the links or levers 87 extending from the jaws 84 to the lifting frames 46, and the links or levers 89 extending from the jaws 85 and engaging in said slots, substantially as described.

4. In combination, the spreading plate 77 pivotally secured at its lower edge to the frame, link 79, levers 41 fast on the shaft 42 supported by the frame, levers 34 pivotally secured at their upper ends to levers 41, plates 38 provided with the grooves 37, blocks 36 sliding in said grooves and pivotally secured to the lower ends of the levers 34, clutch mechanism on the shaft 16, shipping lever 26 and link 31 connecting said shipping lever with the link 31, substantially as set forth.

5. The combination of the grinding cylinder and frame, the grinding wheel 94 rotated by and sliding on the shaft 95, the rotating screw 101 supported by the frame, the nut 100 running on said screw and provided with the yoke engaging the hub of the grinding wheel, the reciprocating rod 113, mounted on the frame, the shipper 112, the clutch mechanism 110 and 111, the connection 118 sliding on said rod 113, the fixed stops 115 on said rod on opposite sides of the connection 118, the yielding stops 117, between said fixed stops and said connection, and springs between said yielding stops and said fixed stops, whereby the shipper is impelled from one clutch into engagement with the other, substantially as described.

GEORGE A. LAWRENCE.

Witnesses:
HENRY W. WILLIAMS,
A. G. BELCHER.